United States Patent [19]

Bonsall

[11] 4,327,185

[45] Apr. 27, 1982

[54] REFRACTORY COMPOSITIONS WITH BINDER

[75] Inventor: Samuel B. Bonsall, Clearfield, Pa.

[73] Assignee: Eltra Corporation, Morris Township, Morris County, N.J.

[21] Appl. No.: 213,514

[22] Filed: Dec. 5, 1980

[51] Int. Cl.³ ............................................. C04B 35/52
[52] U.S. Cl. ....................................................... 501/89
[58] Field of Search ...................... 106/44, 56, 65, 67; 501/89, 90, 100

[56] References Cited

U.S. PATENT DOCUMENTS

| | | | |
|---|---|---|---|
| 2,907,972 | 10/1959 | Schildhauer et al. | 106/44 |
| 2,938,807 | 5/1960 | Andersen | 106/44 |
| 3,607,809 | 9/1971 | Elby | 106/56 |
| 4,072,531 | 2/1978 | Funabiki et al. | 106/56 |
| 4,184,883 | 1/1980 | Hughes et al. | 106/56 |
| 4,210,453 | 7/1980 | Bowers | 106/56 |
| 4,248,638 | 2/1981 | Yomota et al. | 106/56 |

*Primary Examiner*—James Poer
*Attorney, Agent, or Firm*—Roger H. Criss

[57] ABSTRACT

A phenol formaldehyde resin in liquid form is used as a binder for an aggregate refractory composition. The resin has a viscosity at 25° C. of up to about 3000 cps.

8 Claims, No Drawings

REFRACTORY COMPOSITIONS WITH BINDER

DESCRIPTION

1. Field of the Invention

This invention relates to refractory compositions which include a binder, and particularly to blast furnace trough refractories.

2. Description of the Prior Art

Blast furnace trough refractories typically include combinations of sized granular materials, usually of the following types: high-alumina (bauxite, fused alumina, etc.), silicon carbide, and carbon (graphite, coke, etc.). In addition, a plastic ball clay is included and water is added to give a damp, cohesive, granular mixture. This mixture is packaged to prevent moisture loss and shipped to the installation site where it is installed by tamping with an air hammer behind removable forms to form a monolithic trough lining. The forms are subsequently removed and the lining heated on a controlled schedule to remove moisture. During service the lining is subjected to the flow of molten iron and slag each time the blast furnace is tapped.

Two of the basic requirements of a trough refractory are resistance to slag penetration and corrosion, and resistance to erosion by the flow of molten iron. For maximum slag resistance the monolithic lining must tamp as dense as possible and have minimum porosity. For metal erosion resistance the lining must have high mechanical strength at high temperatures (2000°–2700° F.).

Meeting the above requirements is presently a twofold problem. Maximum compaction is difficult to achieve since air hammers do not develop sufficient pressure. Porosities of even the best materials are greater than 20% and usually in the 25-30% range. High strength at high temperatures can best be achieved by the development of a carbon bond such as from the coking of a pitch additive. An example of a pitch bonded refractory is shown in U.S. Pat. No. 4,184,883 to Hughes. During installation and heatup of trough refractories, however, excessive fumes may be evolved from the pitch-containing mixture. It would be desirable to provide an alternate binder for a refractory composition which did not evolve such fumes and at the same time provides at least the same compaction properties.

SUMMARY OF THE INVENTION

In accordance with this invention, there is provided a refractory composition comprising discrete, size graded aggregate particles and a binder for such particles, the binder comprising a phenol formaldehyde resin in liquid form prior to heating and having a viscosity at 25° C. of up to about 3000 cps, more preferably up to 2000 cps and most preferably between about 200–400 cps. The composition preferably includes carbon and a clay, together with alumina and silicon carbide as the aggregate particles.

It has been found that the phenol formaldehyde resins do not produce excessive fumes upon heating of the refractory composition. It has also been surprisingly found that density of the composition after firing is increased and the porosity after firing is decreased over conventional pitch bonded compositions.

DESCRIPTION OF THE PREFERRED EMBODIMENTS

The refractory compositions of the present invention include discrete, size graded aggregate particles. The type of refractory particles employed is determined by the end use of the product and desired performance characteristics. For blast furnace trough refractories, the aggregate preferably comprises sized high alumina, such as fused alumina, bauxite and the like. For other refractory uses, typical refractory materials such as magnesia, zirconia, fused silica and the like may be employed. The aggregate preferably includes silicon carbide when used in blast furnace trough applications, due to its slag resistance. The aggregate may be present in typically employed amounts, such as from about 60 to 98 percent by weight of the total composition, preferably from about 75 to 95 weight percent. When silicon carbide is present, it may be employed in an amount of about 1 to 30 weight percent, preferably about 15 to 25 weight percent. Other slag resistance additives may also be used. Any conventional size gradation of the discrete particles may be used.

The refractory composition preferably also includes a form of carbon such as graphite, coke and the like to provide non-wetting properties. Preferably, the composition includes amorphous graphite present in an amount of about 1 to 25 weight percent, more preferably about 2 to 15 percent.

An additional additive in refractory compositions of this type is a clay for providing plasticity. The preferred clay for a refractory trough composition is ball clay and is present in an amount of about 1 to 25 percent of the total weight of the composition, more preferably about 2 to 10 percent. Other conventional clays may likewise be employed.

In accordance with the present invention a phenol formaldehyde resin is utilized as a binder. The binder is employed in liquid form in order to achieve the best increase in lubricity and has a viscosity at 25° C. of up to about 3000 cps, preferably up to about 2000 cps and most preferably between about 200–400 cps. The presently preferred resin has a viscosity of about 250–350 cps. Phenolic resins having viscosities in the latter range have been found to provide the best results in terms of compaction and porosity. The resins should have some solubility or affinity to water.

The phenol formaldehyde resins are preferably of the resol type and are preferably present in an amount of about 0.5 to 15 weight percent of the total composition, more preferably about 1 to 10 weight percent and most preferably about 2 to 6 percent.

The composition may also contain water to provide a damp, cohesive granular mixture, as is known. Water may be present in conventional amounts, such as about 0.25 to 10 weight percent of the total composition, more preferably about 1 to 5 percent. Of course, other conventional additives may be present.

The compositions of the present invention may be prepared by any conventional process such as employed with pitch bonded refractory compositions. Preferably, the solid components are first dry blended and then the phenolic binder is added with continued blending. Sufficient water is then added with blending to provide the proper consistency.

To further illustrate the invention, the following non-limiting examples are given. All parts and percentages are by weight.

EXAMPLES 1-4

In a Muller mixer were blended sized high alumina aggregate (64 parts fused alumina and 7 parts calcined alumina), sized silicon carbide, amorphous graphite and ball clay in the amounts indicated in Table 1. Example 1, 4 parts of a one-step liquid resol type phenol formaldehyde resin binder having a viscosity at 25° C. of 250-350 cps and good water solubility were added to the mixture following which 1-6 parts of water were added with continued mixing. In a comparative example (Example 2), 6 parts of a pitch binder and 4.8 parts of water were added.

In Examples 3 and 4, calcined bauxite was employed as the predominate high alumina aggregate (64 parts calcined bauxite, 10 parts fused alumina and 5 parts calcined alumina) and silicon carbide was not present. In Example 3 (control) no binder was employed. In Example 4, the same binder as Example 1 was used.

Test bricks having dimensions of 9×4½×2½ inches were pressed from the composition. Pressed densities at 1000 psi before and after drying were determined, as were the density, porosity and modulus of rupture after firing in coke at 1800° F. The results are shown in Table 1.

TABLE 1

| Component | Example 1 | Example 2 | Example 3 | Example 4 |
|---|---|---|---|---|
| Sized High Alumina Aggregate | 71.0 | 71.0 | 79 | 79 |
| Sized Silicon Carbide | 20.0 | 20.0 | — | — |
| Graphite | 3.5 | 3.5 | 13 | 13 |
| Ball Clay | 5.5 | 5.5 | 8 | 8 |
|  | 100.0 | 100.0 | 100 | 100 |
| Pulverized 310° F. Pitch | — | 6 | — | — |
| Liquid Resin Binder | 4 | — | — | 4 |
| Water | 1.6 | 4.8 | 4.5 | 2.7 |
| Properties | | | | |
| Rammed Density, lb/ft$^3$ (at 1000 psi) | 191 | 172 | 172 | 175 |
| Density After Drying (300° F.), lb/ft$^3$ | 186 | 164 | 166 | 171 |
| Density After Firing in Coke (1800° F.), lb/ft$^3$ | 183 | 157 | 160 | 164 |
| Porosity After Firing in Coke (1800° F.), % | 12.9 | 19.4 | 20.9 | 16.6 |
| Modulus of Rupture After Firing in Coke (1800° F.), psi | | | | |
| Tested at 70° F. | 550 | 500 | 250 | 300 |
| Tested at 2000° F. | 750 | 700 | 175 | 430 |

The effect of the liquid resin binder can be clearly seen when comparing the properties of the above mixes. The density of Example 1 is substantially higher than Example 2 after ramming, after drying and after firing at 1800° F. in coke (to prevent oxidation of graphite and silicon carbide in the mix). The coked porosity of Example 1 is also much lower than Example 2. The coked porosity of Example 1 is, in fact, far lower than the 20% level which is considered good for blast furnace trough refractories. The mix of Example 4 likewise shows a higher density and lower porosity than Example 3 without the binder.

There is a difference between the mixes of Example 1 and 2 and the mixes of Examples 3 and 4 in magnitude of the effect of the resin. In the mix of Examples 1 and 2, for example, the rammed density increases from 172 to 191 lb/ft$^3$ by the use of the binder, an 11% increase; and coked porosity drops from 19.4% to 12.6%, a 35% decrease. In the mix of Examples 3 and 4 the percentage changes in rammed density and coked porosity are only 2% and 20%, respectively. This difference in effect may possibly be explained in terms of the types of aggregates used and their relative ease of compaction. The mixes of Examples 1 and 2 consist of fused alumina and silicon carbide with very little graphite. These grains are hard and angular in shape and difficult to compact. In contrast, the mixes of Examples 3 and 4 consist mainly of calcined bauxite, and larger amounts of graphite. The bauxite, with more rounded grains, and the lubricity of the graphite, both aid compaction. Thus, the mix of Example 3 is closer to its maximum possible compaction than Example 2 and the effect of the resin on it is not as dramatic.

The development of a carbon bond can be seen by measuring the strength of the refractories after firing in coke. The mix of Example 2 with a bond formed from the coking of pitch and the mix of Example 1 with a bond formed from the coking of resin have similar strengths measured at both room temperature and 2000° F. The mix of Example 3 with no carbon bond can clearly be seen to be weaker than the mix of Example 4.

EXAMPLES 5-10

In Example 5, Example 1 was repeated using 2 parts of water. This example was then repeated using other resol type liquid phenol formaldehyde resins as follows: Example 6, viscosity of 2000 cps with fair water solubility. Example 7, viscosity of 400-500 cps with fair water solubility. Example 8, viscosity of 150-180 cps with good water solubility. In comparative Examples 9 and 10, powdered two-step novolac type phenol formaldehyde resins were used which had slight water solubility. Test bricks were similarly molded and their properties are shown in Table 2.

TABLE 2

| Resin: | Example 5 | Example 6 | Example 7 | Example 8 | Example 9 | Example 10 |
|---|---|---|---|---|---|---|
| % water added to mix | 2.0% | 3.5% | 2.1% | 2.6% | 6.4% | 4.5% |
| Rammed Density, lb/ft | 188.7 | 187.5 | 188.1 | 186.6 | 175.0 | 182.3 |
| Density After Drying (300° F.), lb/ft | 184.9 | 180.0 | 182.9 | 180.0 | 169.4 | 174.2 |
| Density After Firing in Coke (1800° F.), lb/ft$^3$ | 182.0 | 177.9 | 177.5 | 176.5 | 161.1 | 168.0 |
| Porosity After Firing in Coke (1800° F.), % | 15.3 | 19.4 | 17.2 | 15.8 | 22.0 | — |
| Modulus of Rupture After Firing in Coke (1800° F.), psi | 634 | 421 | 332 | 376 | 175 | 448 |

As shown in Table 2 liquid resins of higher viscosity (Examples 6-7) than Example 5 have less tolerance for water and apparently do not disperse as well in the mix, leading the lower density and lower bond strength. The resin of Example 8 is very similar to that of Example 5 except for having lower viscosity. In this case the resin is apparently too thin to provide good lubricity for maximum compaction. Powdered resins (Examples 9 and 10) provide little lubricity to the mix, and properties are consequently the poorest for these.

Service results have shown the advantage of the resin-bonded mixes of this invention. A mixture of the composition of Example 4 was rammed in a main iron trough of a large 3-taphole furnace. The mixture exceeded 29,000 tons of iron cast before needing patching as compared to an average of 15,000 tons for the mixture of Example 3, the former standard product. A mixture of the composition of Example 1, when tried in a tilting iron runner lasted 146,000 tons of iron without a patch versus an average of 86,000 tons for the mixture of Example 2, the previous standard.

The mixes of the present invention may be rammed without excessive fumes during installation and heat up. As indicated above, it has been surprisingly found that compaction of the mixes is greatly enhanced by the presence of the binder of this invention, resulting in higher densities and lower porosities. The liquid binder imports a degree of lubricity to the refractory aggregates which allows very easy compaction by air hammers. In addition, the binder is thermosetting and has a high coking value. The binder provides the same carbon bonding and higher temperature strength as pitch, but without excessive fumes.

Although in the above description reference has been primarily made to ramming mixes for blast furnace troughs, the compositions of this invention may be utilized in other refractory shapes and environments.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. A refractory composition comprising about 60 to 98 weight percent of discrete, size graded aggregate particles of high alumina, carbon and clay, and as binder a resol phenol formaldehyde resin in liquid form prior to heating and having a viscosity at 25° C. of up to about 3000 cps.

2. The composition of claim 1 wherein said resin has a viscosity of about 200 to 400 cps.

3. The composition of claim 2 including about 1 to 30 weight percent of silicon carbide particles.

4. The composition of claim 3 including about 75 to 95 weight percent of said high alumina particles, about 2 to 15 weight percent carbon in the form of graphite, about 0.5 to 15 weight percent of said resin and about 1 to 25 weight percent clay.

5. The composition of claim 4 including about 15 to 25 weight percent of said silicon carbide particles, about 1 to 10 weight percent of said resin and about 2 to 10 weight percent of a ball clay.

6. The composition of claim 5 including water.

7. The composition of claim 1 including about 1 to 30 weight percent of silicon carbide particles.

8. A refractory composition for use as a rammable blast furnace through refractory, comprising about 75 to 95 weight percent of discrete, size graded aggregate particles of high alumina, about 2 to 15 weight percent graphite, about 2 to 10 weight percent of a ball clay, about 15 to 25 weight percent of silicon carbide particles, and about 1 to 10 weight percent of a resol phenol formaldehyde resin in liquid form prior to heating and having a viscosity at 25° C. of 200 to 400 cps.

* * * * *